United States Patent
Umezu et al.

(10) Patent No.: US 9,570,965 B2
(45) Date of Patent: Feb. 14, 2017

(54) ROTOR COIL FOR ARMATURE OF ROTATING MACHINE AND PRODUCTION METHOD THEREOF

(71) Applicant: HITACHI, LTD., Tokyo (JP)

(72) Inventors: Ryosuke Umezu, Hitachi (JP); Yasuaki Kageyama, Hitachi (JP); Juichi Enyama, Hitachi (JP); Seunghwan Park, Mito (JP); Satoshi Hirano, Hitachi (JP)

(73) Assignee: MITSUBISHI HITACHI POWER SYSTEMS, LTD., Kanagawa (JP)

(*) Notice: Subject to any disclaimer, the term of this patent is extended or adjusted under 35 U.S.C. 154(b) by 768 days.

(21) Appl. No.: 13/765,169

(22) Filed: Feb. 12, 2013

(65) Prior Publication Data

US 2013/0214636 A1    Aug. 22, 2013

(30) Foreign Application Priority Data

Feb. 17, 2012   (JP) ................................ 2012-033012

(51) Int. Cl.
*H02K 3/14*    (2006.01)
*H02K 15/02*   (2006.01)
(Continued)

(52) U.S. Cl.
CPC .............. *H02K 15/02* (2013.01); *H02K 3/14* (2013.01); *H02K 3/51* (2013.01); *H02K 15/0414* (2013.01);
(Continued)

(58) Field of Classification Search
CPC .............. H02K 3/14; H02K 3/28; H02K 3/46; H02K 15/0037; H02K 15/0043; H02K 15/063
See application file for complete search history.

(56) References Cited

U.S. PATENT DOCUMENTS

| 1,775,633 | A | * | 9/1930 | Apple | ...................... | H02K 3/12 310/201 |
| 2,714,675 | A | * | 8/1955 | Heidbreder | ............ | H02K 1/265 29/596 |

(Continued)

FOREIGN PATENT DOCUMENTS

| CN | 1144499 A | 3/1997 |
| CN | 1212194 A | 3/1999 |

(Continued)

OTHER PUBLICATIONS

Japanese Office Action received in corresponding Japanese Application No. 2013-019054 dated Apr. 26, 2016.
(Continued)

*Primary Examiner* — Dang Le
(74) *Attorney, Agent, or Firm* — Mattingly & Malur, PC (57) ABSTRACT

A rotor coil for a revolving armature includes a strand coil that includes a part arranged in a core slot of the rotor and is composed of a plurality of element wires; and a solid coil welded to an end of the strand coil wherein the end of the strand coil and an end of the solid coil are welded by friction stir welding. A manufacturing method of a rotor coil includes the step of performing friction stir welding wherein the friction stir welding is performed for the butt joint with the end of the strand coil arranged in an advancing side defined by a rotation direction of a tool and with the solid coil arranged in a retreating side.

10 Claims, 8 Drawing Sheets

(51) Int. Cl.
*H02K 3/51* (2006.01)
*H02K 15/04* (2006.01)
*H02K 3/28* (2006.01)
*H02K 3/46* (2006.01)

(52) U.S. Cl.
CPC . *H02K 3/28* (2013.01); *H02K 3/46* (2013.01); *Y10T 29/49012* (2015.01)

(56) References Cited

U.S. PATENT DOCUMENTS

| | | | |
|---|---|---|---|
| 5,813,592 | A | 9/1998 | Midling et al. |
| 6,538,203 | B1* | 3/2003 | Nolle ........................ H01R 4/62 174/84 C |
| 2003/0098336 | A1 | 5/2003 | Yamashita |
| 2010/0018768 | A1* | 1/2010 | Takahashi .............. H01R 4/183 174/74 R |
| 2014/0144015 | A1* | 5/2014 | Mayer ................ H01R 43/0207 29/860 |

FOREIGN PATENT DOCUMENTS

| | | |
|---|---|---|
| CN | 1421294 A | 6/2003 |
| EP | 0 893 190 A2 | 1/1999 |
| JP | 63-124738 A | 5/1988 |
| JP | 2529953 B2 | 6/1996 |
| JP | 2008-182848 A | 8/2008 |
| JP | 2008-194732 A | 8/2008 |
| JP | 2009-195008 A | 8/2009 |
| JP | 2010-125495 A | 6/2010 |
| JP | 2011-235335 A | 11/2011 |

OTHER PUBLICATIONS

Chinese Office Actions received in corresponding Chinese Application No. 201310050909.3 dated Jan. 30, 2015.
Chinese Office Actions received in corresponding Chinese Application No. 201310050909.3 dated Nov. 2, 2015.
Zhanhui, H., "Application Prospect of Friction Stir Welding in Manufacturing Electric Motor", Hongdu Science and Technology, 2002, pp. 15-17.
Chinese Office Action received in corresponding Chinese Application No. 2013100509093 dated Nov. 3, 2016.

* cited by examiner

ROTOR COIL FOR ARMATURE OF ROTATING MACHINE AND PRODUCTION METHOD THEREOF

BACKGROUND OF THE INVENTION

The present invention relates to a rotor coil for a revolving armature and the manufacturing method thereof.

In the rotor coil of a variable speed generator motor used in a pumped storage system, the strand coils extending from each of a plurality of core slots (Roebel-transposed (coil braided) coil conductors) are welded to the solid coils that form the coil end. A plurality of solid coils, provided at the coil end around the axis of the rotor, is supported and secured by tightly fastening with the binding wires that are wound around the solid coils (for example, see Japanese Patent No. 2529953).

In such a rotor coil, to prevent the coil end from being displaced in the centrifuge direction by the centrifugal force generated during the operation of a power generator, the coil end is made of solid coils of high mechanical strength and is supported and secured strongly by binding wires. On the other hand, Roebel-transposed strand coils are used in a core slot to reduce a circulating current loss. The rotor coil having this configuration therefore increases durability.

SUMMARY OF THE INVENTION

Welding between the solid coils and the strand coils in a conventional rotor coil is performed by means of Tungsten Inert Gas (TIG) welding (for example, Japanese Patent No. 2529953). More specifically, the butt joint between the solid coils and the strand coils is formed by multi-pass welding while measuring the interlayer temperature. The problem with such TIG welding is that it depends largely on the worker's professional skill and there is a variation in quality with the result that the yield rate is low. In addition, multi-pass layer wilding requires more work time. Another problem is that, because there are great many TIG welding points in a conventional rotor coil, the work to weld the solid coils and the strand coils is extremely complicated.

When a variable speed generator motor, in which the solid coils are supported and secured by binding wires, is started and stopped repeatedly, stress is generated in the welded joint between the solid coils and the strand coils due to thermal expansion and contraction. Therefore, considering that there is an increasing need today for a large-capacity, high-voltage variable speed generator motor, more reliability is desired for the welded joint between the solid coils and the strand coils than before.

In view of the foregoing, it is an object of the present invention to provide a rotor coil for a revolving armature and a manufacturing method thereof for forming a more reliable welded joint between the solid coils and the strand coils in a simpler manner than before.

To solve the problems described above, a rotor coil for a revolving armature according to an embodiment of the present invention is characterized in that the end of the solid coils at the coil end and the end of the strand coils extending from within the core slots are welded by friction stir welding.

A manufacturing method of a rotor coil for a revolving armature according to an embodiment of the present invention, which solves the problems described above, is a manufacturing method of a rotor coil for a revolving armature in which the end of a solid coil at the coil end and the end of a strand coil extending from the core slot are welded. The method includes the step of forming the end of the solid coil and the end of the strand coil in such a way that the butt joint between the end of the solid coil and the end of the strand coil is tilted to a width direction of the solid coil; and the step of performing friction stir welding for the butt joint where the end of the solid coil and the end of the strand coil are butted against each other.

The manufacturing method of a rotor coil for a revolving armature according to the embodiment of the present invention further includes the step, before the step of performing friction stir welding for the butt joint, of soldering the end of the strand coil to integrate element wires into one unit.

The present invention can provide a rotor coil for a revolving armature and a manufacturing method thereof for forming a more reliable welded joint between solid coils and strand coils in a simpler manner than before.

Other objects, features and advantages of the invention will become apparent from the following description of the embodiments of the invention taken in conjunction with the accompanying drawings.

DESCRIPTION OF THE EMBODIMENTS

Figure 1:
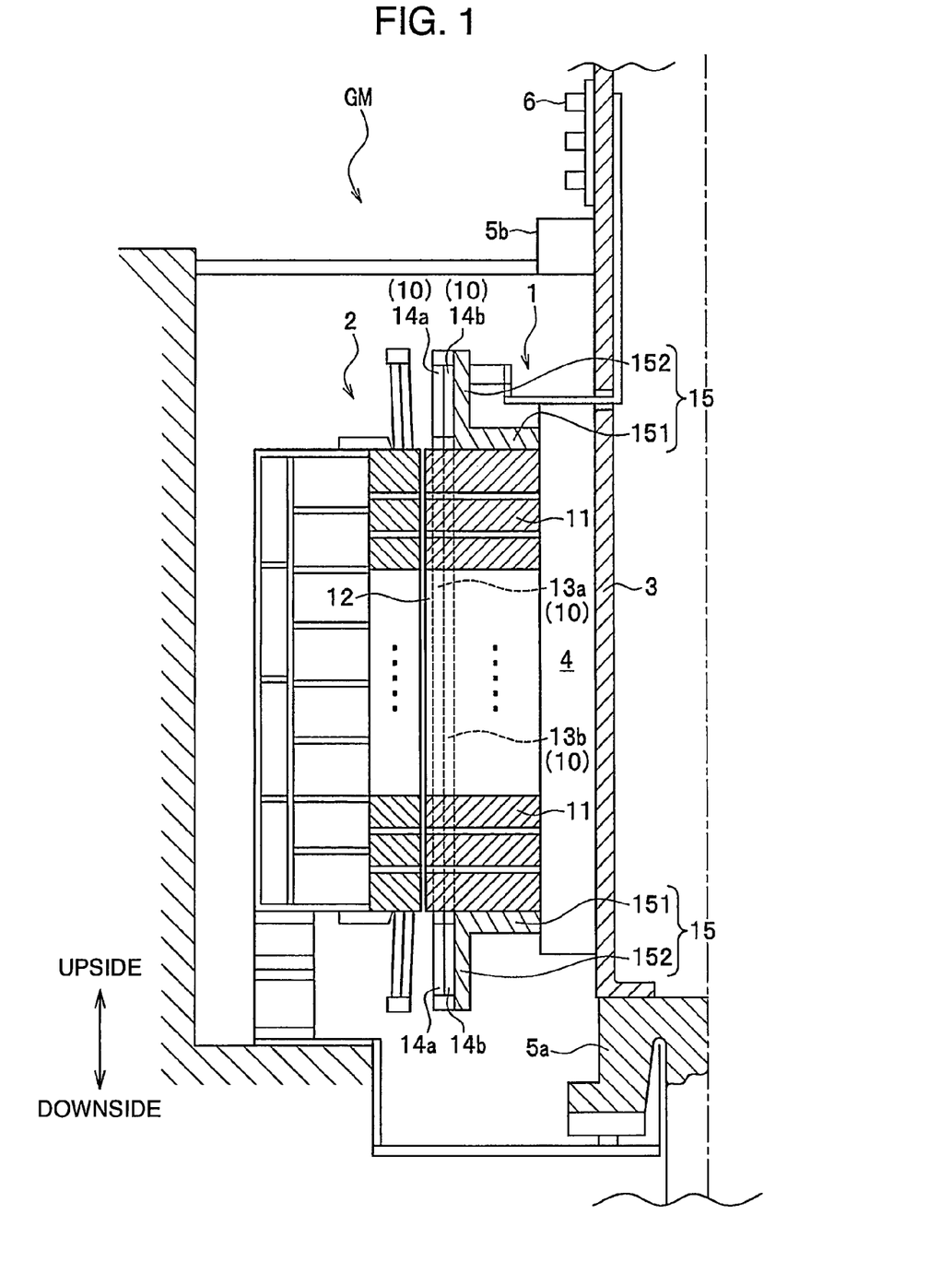
FIG. 1 is a partial cross section schematically showing the left half of the cross section along the axis of rotation of a variable speed generator motor to which a rotor coil for a revolving armature according to an embodiment of the present invention is applied.
Figure 4:
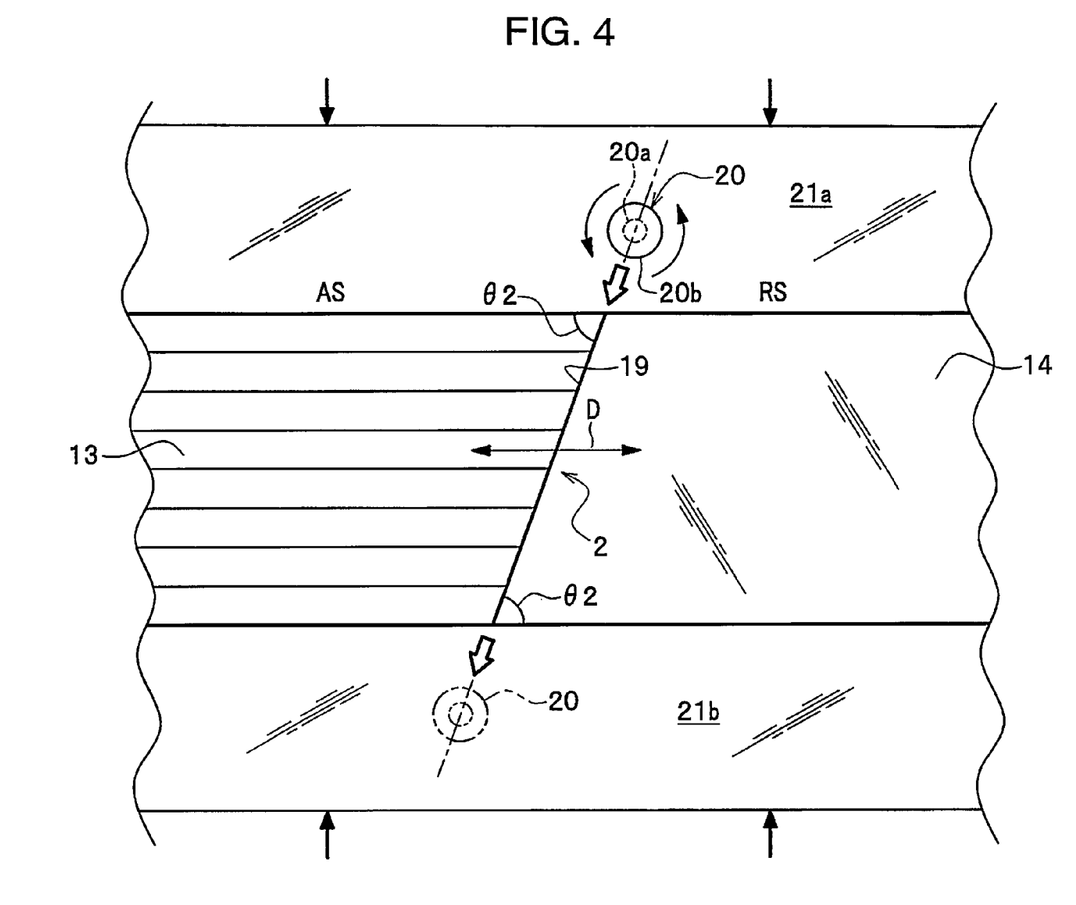
FIG. 4 is a diagram showing a manufacturing method for the rotor coil for a revolving armature in this embodiment of the present invention and a plan view showing the welding of a strand coil and a solid coil by friction stir welding.
Figure 6A:
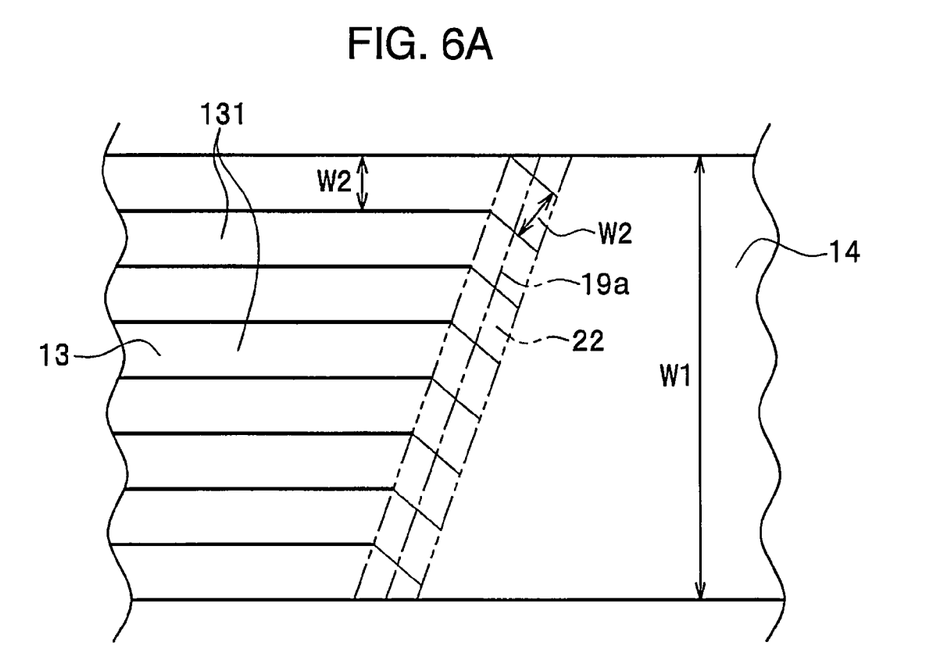
FIG. 6A is a plan view showing a welded joint between a strand coil and a solid coil welded by friction stir welding in the manufacturing method of a rotor coil for a revolving armature in the embodiment of the present invention, and is a plan view showing a welded joint in which a butt joint between the end of the strand coil and the end of the solid coil is tilted to the width direction of the solid coil.
Figure 6B:
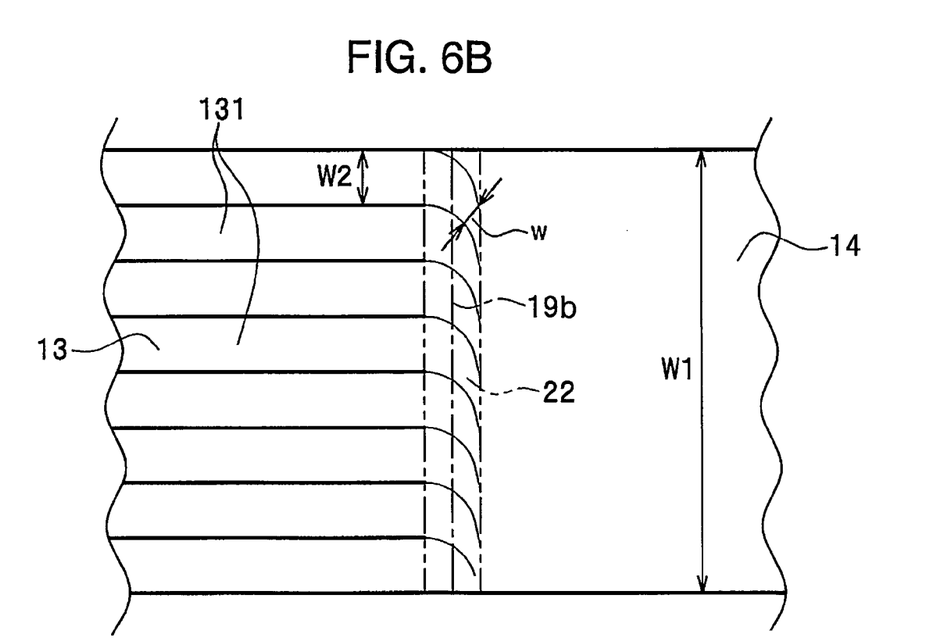
FIG. 6B is a plan view showing a welded joint between a strand coil and a solid coil welded by friction stir welding in the manufacturing method of a rotor coil for a revolving armature in the embodiment of the present invention, and is a plan view showing a welded joint in which a butt joint between the end of the strand coil and the end of the solid coil is formed in such a manner that the butt joint runs along the width direction of the solid coil.

A rotor coil for a revolving armature (hereinafter simply called "rotor coil") according to an embodiment of the present invention is described in detail below with reference to the drawings as necessary. FIG. 1 is a partial cross section schematically showing the left half of the cross section along the axis of rotation of the variable speed generator motor. Note that the top-bottom direction in the description below is based on the top-bottom direction shown in FIG. 1 except when FIG. 4 and FIG. 6 are referenced during the description.

As will be described later, the rotor coil of the present invention is characterized in that the end of solid coils and the end of strand coils are welded by friction stir welding. The following first describes the general configuration of a variable speed generator motor used, for example, in a pumped storage system. After that, a rotor coil according to this embodiment, which is applied to the variable speed generator motor, is described.

As shown in FIG. 1, the variable speed generator motor (revolving armature) GM in this embodiment includes a rotor 1 fixed on an axis of rotation 3 via a spider arm 4, a stator 2 opposed to the rotor 1 via a clearance in the radial direction, a first bearing 5a and a second bearing 5b that rotatably support the axis of rotation 3, and a slip ring 6 provided near the upper end of the axis of rotation 3. Note that a pump turbine (not shown) is linked to the rotation unit (not shown) below the first bearing 5a.

The rotor 1 includes an almost cylindrical rotor core 11 configured by laminating a plurality of almost circular plates in the extending direction of the axis of rotation 3.

The rotor core 11 has a plurality of equally-spaced, groove-like core slots 12 formed along its periphery. Each of these core slots 12 is formed in the extending direction of the axis of rotation 3 in the shape of a long groove. In the core slot 12, an outer circumference strand coil 13a and an inner circumference strand coil 13b are extended along the longitudinal direction. The outer circumference strand coil 13a and the inner circumference strand coil 13b are Roebel-transposed, or coil-braided, to reduce losses. The inner circumference strand coil 13b is arranged nearer to the axis of rotation 3 in the core slot 12, and the outer circumference strand coil 13a is arranged in the upper side (outer side in the radial direction of the rotor 1) of the inner circumference strand coil 13b.

The outer circumference strand coil 13a and the inner circumference strand coil 13b, as well as an outer circumference solid coil 14a and an inner circumference solid coil 14b that will be described later, constitute a rotor coil 10 in this embodiment.

In FIG. 1, the numeral 15 indicates a pair of clamping rings. Each of the two clamping rings 15 includes two components: pressure unit 151 and solid coil holding unit 152. The disc-shaped pressure units 151 hold the rotor core 11 on both sides to apply pressure in the laminating direction, and the cylindrical solid coil holding units 152 are provided integrally with the peripheral surface of the pressure units 151. The solid coil holding unit 152 has, on its outer circumference surface, the outer circumference solid coil 14a and the inner circumference solid coil 14b that form the coil end described below. In FIG. 1, the binding wires, provided on the solid coil holding unit 152 to tightly bind and support/secure the outer circumference solid coil 14a and the inner circumference solid coil 14b, is omitted for sake of drawing clarity.

Figure 2:
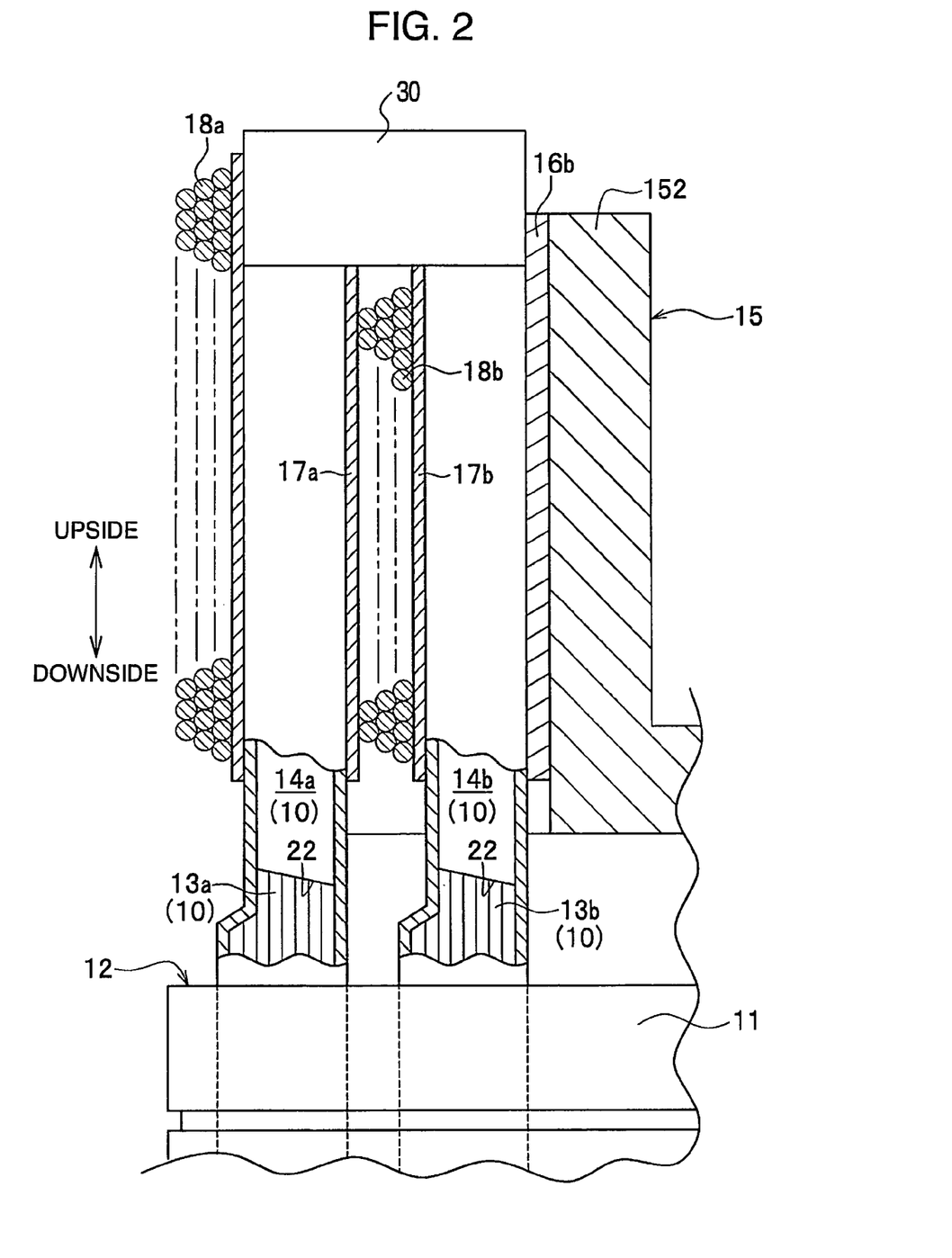
FIG. 2 is a partially enlarged cross section showing a part around the coil end of the rotor of the variable speed generator motor in FIG. 1.

FIG. 2 is a partially enlarged cross section showing a part around the coil end of the rotor. Of the two coil ends (upper and lower in FIG. 1), FIG. 2 shows the upper coil end. The following describes the upper coil end and omits the description of the lower coil end that is configured similarly to the upper end.

As shown in FIG. 2, each of the outer circumference solid coil 14a and the inner circumference solid coil 14b is formed by a stick-like solid coli bar. A plurality of outer circumference solid coils 14a and a plurality of inner circumference solid coils 14b are arranged so that they correspond one-to-one to the outer circumference strand coils 13a and the inner circumference strand coils 13b extending from within each of a plurality of core slots 12 of the rotor core 11. As described above, the outer circumference solid coil 14a and the inner circumference solid coil 14b, as well as the outer circumference strand coil 13a and the inner circumference strand coil 13b, constitute the rotor coil 10 in this embodiment.

Each of the outer circumference strand coil 13a and the inner circumference strand coil 13b, extending from within the core slot 12 of the rotor core 11, forms an end near the exit of the core slot 12 on the top face of the rotor core 11 (or on the bottom face of the rotor core 11 at the lower coil end not shown). The ends of the outer circumference strand coil 13a and the inner circumference strand coil 13b are welded, respectively, to the ends of the outer circumference solid coil 14a and the inner circumference solid coil 14b by friction stir welding. Friction stir welding will be described in detail later.

As described above, a plurality of inner circumference solid coils 14b is arranged so that they each correspond to the inner circumference strand coils 13b. At the same time, the inner circumference solid coils 14b are arranged on the outer circumference face of the solid coil holding unit 152 of the clamping ring 15 via a cushioning material 16b as shown in FIG. 2. The inner circumference solid coils 14b are equally spaced along the circumferential direction of the solid coil holding unit 152.

As shown in FIG. 2, these inner circumference solid coils 14b are supported/secured by fastening with the binding wires 18b, which are wound around the inner circumference solid coil 14b, in their longitudinal direction (in top-bottom direction in FIG. 2) via an insulating layer 17b. The binding wires 18b are wound in multiple layers.

As described above, a plurality of outer circumference solid coils 14a is arranged so that they each correspond to the outer circumference strand coils 13a. At the same time, the inner circumference solid coils 14b are arranged on the upper side (radially outer side of the rotor) of the binding wires 18b, which are wound around the inner circumference solid coils 14b, via an insulating layer 17a as shown in FIG. 2. Note that the outer circumference solid coil 14a is on the upper side (radially outer side of the rotor) of, and is overlaid on, the inner circumference solid coil 14b.

As shown in FIG. 2, these outer circumference solid coils 14a are supported/secured by fastening with the binding wires 18a, which are wound around the outer circumference solid coil 14a in the longitudinal direction (in top-bottom direction in FIG. 2) via the insulating layer 17a. The binding wires 18a are wound in multiple layers. The outer circumference solid coil 14a and the inner circumference solid coil 14b are connected by a connection member 30.

Next, the following describes the welded joint between the outer circumference strand coil 13a and the outer circumference solid coil 14a and the welded joint between the inner circumference strand coil 13b and the inner circumference solid coil 14b. In FIG. 2, the numeral 22 indicates the welded joint between the outer circumference strand coil 13a and the outer circumference solid coil 14a and between the inner circumference strand coil 13b and the inner circumference solid coil 14b.

Referring to FIG. 2, the welded joint configuration between the outer circumference strand coil 13a and the outer circumference solid coil 14a is almost similar to the welded joint configuration between the inner circumference strand coil 13b and the inner circumference solid coil 14b. Therefore, in the description below, no distinction is made between the welded joint between the outer circumference strand coil 13a and the outer circumference solid coil 14a and the welded joint between the inner circumference strand coil 13b and the inner circumference solid coil 14b. Instead, these configurations are described simply as the welded joint between the strand coil 13 and the solid coil 14.

Figure 3:
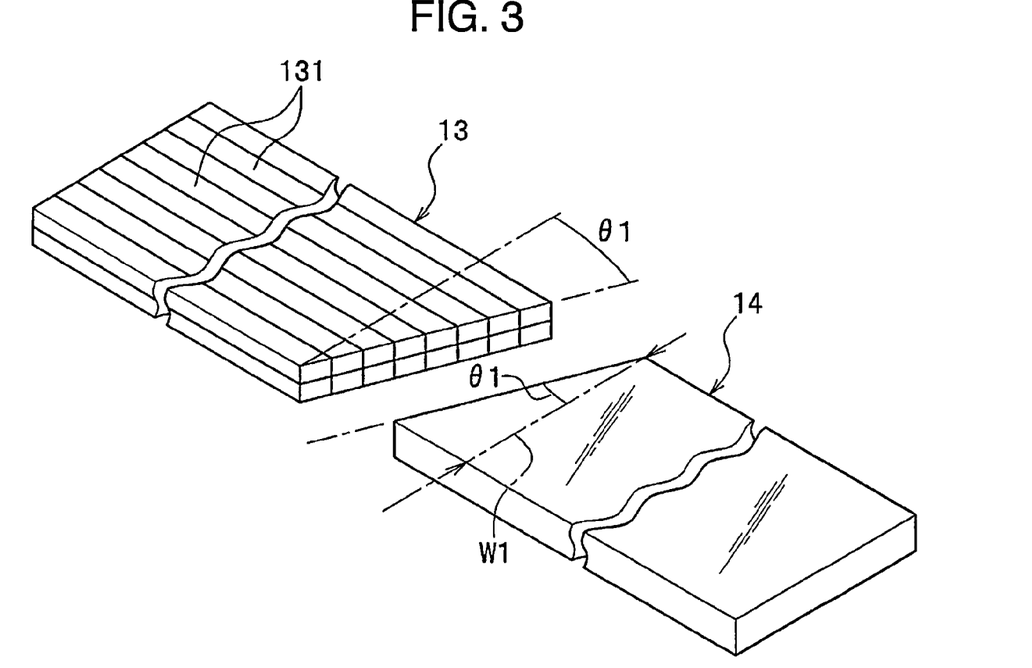
FIG. 3 is a disjoined perspective view showing the ends of a strand coil and a solid coil, which configure the rotor coil for a revolving armature in this embodiment of the present invention, when they are disjoined at the butt joint.

FIG. 3 is a partial perspective view showing the ends of a strand coil and a solid coil, which configure the rotor coil in this embodiment, when they are disjoined.

As shown in FIG. 3, the end of the strand coil 13 and the end of the solid coil 14, which are to be welded together by friction stir welding, have the same width and the same thickness. Although, in this embodiment, the thickness of the outer circumference solid coil 14a and the inner circumference solid coil 14b at a predetermined position, distant from the welded joint with the outer circumference strand coil 13a and the inner circumference strand coil 13b, is smaller than that of those solid coils at the welded joint as shown in FIG. 2, the thicknesses are the same in FIG. 3 for convenience of drawing.

The strand coil 13 in this embodiment is configured by braiding a plurality of rectangular cross-section wires of oxygen free high conductivity copper as shown in FIG. 3. The solid coil 14 in this embodiment is configured by a plate of silver-containing oxygen free high conductivity copper. At least, the strand coil 13 made of oxygen free high conductivity copper is softer than the solid coil 14 made of silver-containing oxygen free high conductivity copper when an elastic flow is generated at friction stir welding time. Therefore, as will be described in detail later, the strand coil 13 is arranged in the advancing side (AS) when friction stir welding is performed.

It is desirable that the butt joint between the end of the solid coil 14 and the end of the strand coil 13 in this embodiment be formed in such a manner that the butt joint is tilted at a predetermined angle of θ1 to the width direction W1 of the solid coil 14. The end of the solid coil 14 and the end of the strand coil 13 are welded by friction stir welding described below.

Next, with reference to FIG. 4, the following describes the manufacturing method for the rotor coil 10 (see FIG. 2) in this embodiment. In the description, the welding method for welding the solid coil 14 and the strand coil 13 by friction stir welding in this embodiment is also described. FIG. 4 is a diagram showing a manufacturing method for the rotor coil in this embodiment and a plan view showing the welding of a strand coil and a solid coil by friction stir welding.

In FIG. 4, the numeral 13 indicates a strand coil, the numeral 14 indicates a solid coil, the numeral 19 indicates a butt joint between the strand coil 13 and the solid coil 14, the numeral 21a indicates an upper pressing plate, the numeral 21b indicates a lower pressing plate, the numeral 20a indicates the pin (probe) of a tool 20 for friction stir welding, and the numeral 20b indicates a shoulder.

Figure 5A:
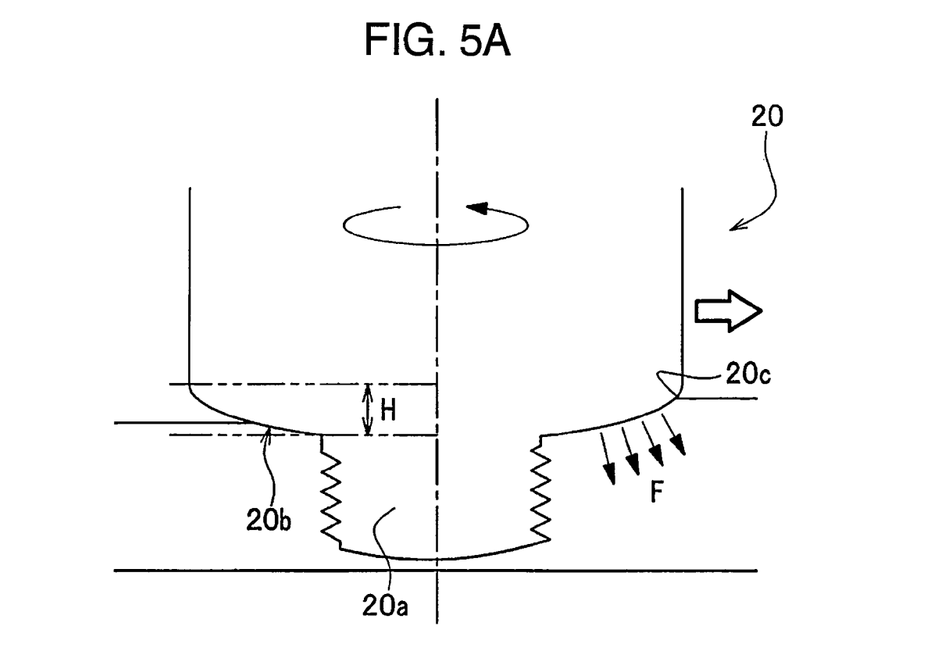
FIG. 5A is a diagram showing the configuration of a tool for friction stir welding used in the manufacturing method of the rotor coil for a revolving armature in the embodiment of the present invention.
Figure 5B:
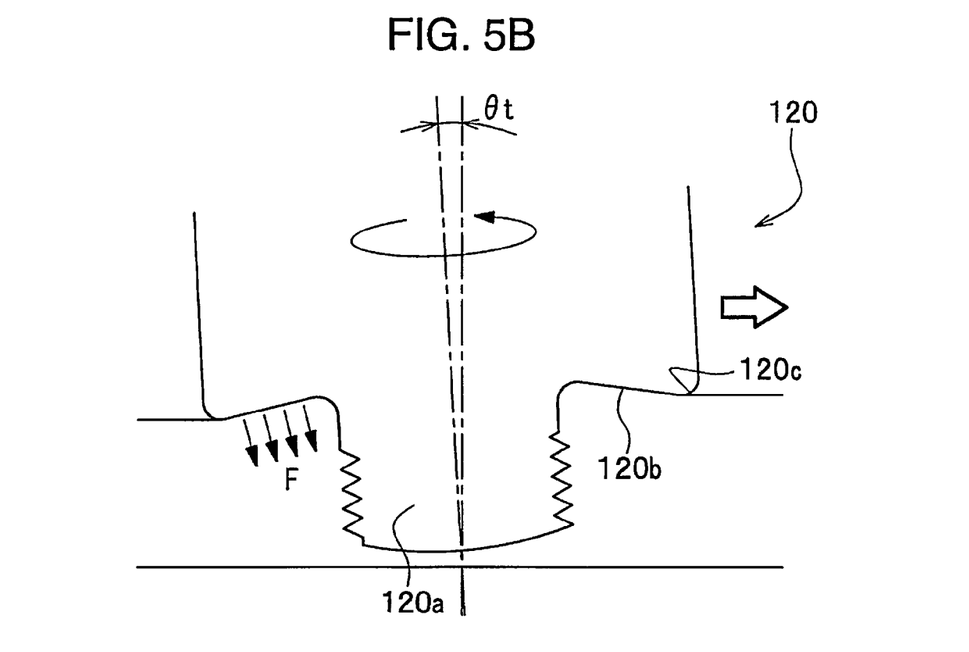
FIG. 5B is a diagram showing the configuration of another tool for friction stir welding.

Next, FIG. 5A is a diagram showing the configuration of a tool for friction stir welding used in the manufacturing method of the rotor coil for revolving armature in this embodiment, and FIG. 5B is a diagram showing the configuration of another example of a tool for friction stir welding.

As shown in FIG. 5A, the tool 20 used in this embodiment (see FIG. 4) is formed by a convex surface part where the shoulder 20b protrudes the convex amount (protrusion height H) from a shoulder outer edge 20c toward the side of the pin 20a in the center.

As described above, when welding the butt joint 19 (see FIG. 4) between the strand coil 13 (see FIG. 4) and the solid coil 14 (see FIG. 4) by friction stir welding using the tool 20, the tool 20 advances as follows. That is, as shown in FIG. 5A, the tool 20 advances with the axis of rotation of the tool 20 kept perpendicular to the welding direction (indicated by a hollow arrow in FIG. 5A) and, in the forward of the welding direction, the shoulder 20b presses the butt joint 19 between the strand coil 13 and the solid coil 14 with the downward pressure F.

A tool 120 shown in FIG. 5B is formed in such a manner that a shoulder 120b becomes concave from a shoulder outer edge 120c toward a pin 120a in the center. At a welding time, the tool 120 advances as follows. That is, as shown in FIG. 5B, the tool 120 advances with the axis of rotation of the tool 120 kept tilted backward at the tilt angle of θt to the welding direction (indicated by a hollow arrow in FIG. 5A) to the welding direction (indicated by a hollow arrow in FIG. 5B) and, in the backward of the welding direction, the shoulder 120b presses the butt joint 19 (see FIG. 4) with the downward pressure F.

First, in the manufacturing method of the rotor coil 10 in this embodiment, it is desirable that, as described above, the butt joint 19 (see FIG. 4) between the end of the solid coil 14 (see FIG. 3) and the end of the strand coil 13 (see FIG. 3) be formed in such a manner that the butt joint 19 (see FIG. 4) is tilted at a predetermined angle of θ1 (see FIG. 3) to the width W1 direction of the solid coil 14. In other words, the butt joint 19 is formed as shown in FIG. 4 in such a manner that each of the end of the solid coil 14 and the end of the strand coil 13 has the end angle θ2 to the extending direction D of the joint between the solid coil 14 and the strand coil 13 near the welded joint 22. The end angle θ2 in this embodiment is defined by the acute angle (θ2=90° (deg.)−θ1) of the angles at both ends of the strand coils 13. It is desired that the value of θ2 be as small as possible.

Next, in the manufacturing method of the rotor coil 10 in this embodiment, friction stir welding is performed for the butt joint 19 using the tool 20 (see FIG. 5A) described above. At this time, as shown in FIG. 4, it is desirable that the strand coil 13 be arranged in the advancing side (AS) defined by the direction of rotation of the tool 20 and that the solid coil 14 be arranged in the retreating side (RS). That is, when the tool 20, which operates in the counterclockwise direction when viewed from top (from above the figure in FIG. 4), is used to perform friction stir welding, it is desirable that the strand coil 13 be arranged in the side in which friction stirring is performed in the forward direction that is the same direction in which the tool 20 advances (indicated by solid arrow in FIG. 4) and that the solid coil 14 be arranged in the side in which friction stirring is performed in the backward direction. In other word, it is desirable that the strand coil 13, which is softer than the solid coil 14, be arranged in the advancing side (AS) in which the force of stir is stronger.

The strand coil 13 and the solid coil 14, which have their ends butted against each other, are fixed by tightly holding them between the upper pressing plate 21a and the lower pressing plate 21b, provided at the both end edges in the longitudinal direction, and by pressing their end edges.

After that, in the manufacturing method of the rotor coil 10 in this embodiment, friction stir welding is performed in such a manner that the tool 20 enters the butt joint 19 from the side, where the strand coil 13 arranged in the advancing side (AS) is at an acute angle of θ2 at the end, as shown in FIG. 4.

At this time, the tool 20, which is pushed against a predetermined position on the upper pressing plate 21a on an extension of the butt joint 19, enters the butt joint 19 from the side of the upper pressing plate 21a. After the butt joint 19 is welded, the tool 20 advances to the lower pressing plate 21b and then leaves the lower pressing plate 21b. This welding method prevents a mark (hole) of removal of the tool 20 from being formed in the welded joint between the strand coil 13 and the solid coil 14.

In the manufacturing method of the rotor coil 10 in this embodiment, the tool 20 (see FIG. 5A) is used. Unlike the conventional tool 120 (see FIG. 5B), the tool 20 can perform friction stir welding without tilting the axis of rotation. This reduces the amount of insertion of the pin 20a (see FIG. 5A) into the butt joint 19 (see FIG. 4). This means that the manufacturing method in this embodiment reduces concavity in the welded joint. In this case, the strand coil 13, softer than the solid coil 14, is arranged in the advancing side (AS) as described above. This arrangement allows the tool 20, which advances with the axis of rotation kept in the vertical direction, to reduce the difference in force of stir between the advancing side (AS) and the retreating side (RS).

The welded joint between the strand coil 13 the solid coil 14, welded by friction stir welding as described above, is arranged as shown in FIG. 1 and FIG. 2. This arrangement configures the rotor 1 in the embodiment of the present invention and a variable speed generator motor (GM) that has this rotor 1.

The production method of the rotor coil 10 in this embodiment described above achieves the following effect.

The problem with a conventional rotor coil (for example, see Japanese Patent No. 2529953) is a decrease in mechanical strength in a heal-affected portion formed by TIG welding and an effect of a defect within a welded joint. More specifically, a solid coil supported and secured by binding wires in a conventional rotor coil. Therefore, when a variable speed generator motor is started and stopped repeatedly, thermal stress is generated in a welded joint with the result that the durability (reliability) of a welded joint becomes insufficient.

In contrast, a welded joint between the solid coil 14 and the strand coil 13 is formed by friction stir welding in this embodiment, meaning that a defect within a welded joint and a range of a thermal affected portion are significantly smaller than those formed by TIG welding. This embodiment significantly increases durability (reliability) of a welded joint. More specifically, this embodiment significantly increases tensile strength in a welded joint.

According to this embodiment, a butt joint between the end of the solid coil 14 and the end of the strand coil 13 is tilted and, at the same time, friction stir welding is performed for this butt joint. This configuration further increases mechanical strength in a welded joint. Next, FIGS. 6A and 6B are plan views showing a welded joint between a strand coil and a solid coil welded by friction stir welding in the manufacturing method of a rotor coil for a revolving armature in this embodiment. FIG. 6A is a plan view showing a welded joint in which a butt joint 19a between the end of a strand coil and the end of a solid coil is tilted to the width direction of the solid coil. FIG. 6B is a plan view showing a welded joint in which a butt joint 19b between the end of a strand coil and the end of a solid coil is formed in such a manner that the butt joint 19b runs along the width direction of the solid coil. Except the condition for the tilting angle of the butt joint 19b, the welded joints shown in FIG. 6A and FIG. 6B are those formed by friction stir welding shown in FIG. 4. That is, the welded joints are formed by causing the tool 20, which operates counterclockwise, to enter the butt joint 19b from the side of the upper pressing plate 21a.

When the butt joint 19b between the strand coil 13 and the solid coil 14 is formed in a way in which the butt joint 19b runs along the width (W1) direction of the solid coil 14 (vertical to the end edge of the solid coil 14) as shown in FIG. 6B, stirring is performed in such a manner that, when stirring is performed by the tool 20 (see FIG. 4) at the welded joint 22, the width W2 of an element wire 131 of the strand coil 13 becomes tapered to the width w as the element wire 131 gets nearer to the solid coil 14.

In contrast, when the butt joint 19a is formed in such a manner that the butt joint 19a is tilted with respect to the width W1 direction of the solid coil 14 as shown in FIG. 6A, the width W2 of the element wire 131 of the strand coil 13 does not become tapered to the width w as shown in FIG. 6B even when the element wire 131 gets nearer to the solid coil 14. Instead, stirring can be performed with the width W2 of the element wire 131 kept almost the same. This means that the welded joint 22 (see FIG. 6A), which is a butt joint when the butt joint 19a between the strand coil 13 and the solid coil 14 is tilted, is superior in tensile strength than the welded joint 22 (see FIG. 6B) which is a butt joint when the butt joint 19b is formed vertically to the end edge of the solid coil 14.

Figure 8:
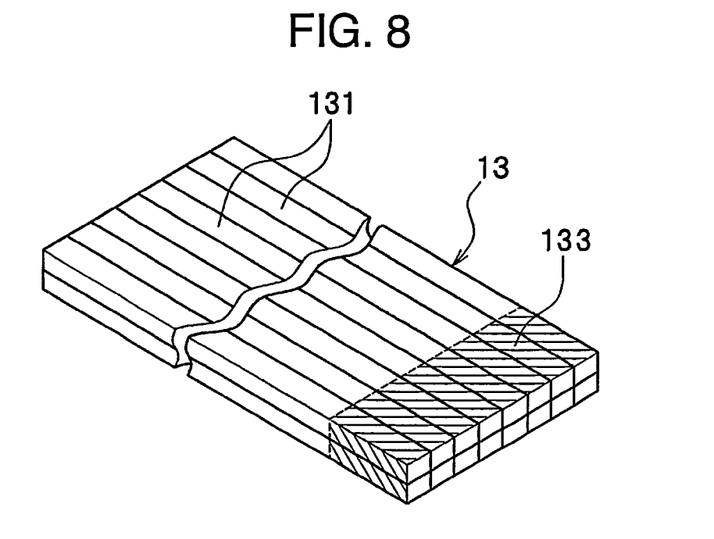
FIG. 8 is a perspective view showing a step for applying soldering to the end of a strand coil.

Note that the method described below can prevent the tensile strength of the welded joint from being decreased even when friction stir welding is performed for the butt joint 19b such as the one shown in FIG. 6B. To do so, an area 133 at the end of the strand coil 13, indicated by the hatching in FIG. 8, is soldered with silver solder before performing friction stir welding. At soldering time, with the solder material placed on the top and bottom faces of the area 133 of the strand coil, the solder material is melted with high-frequency heating to integrate the element wires 131 of the area 133 into one unit. The solder material, melted with heat generated at friction stir welding time, flows into the clearance gaps between the element wires through capillary phenomenon, further increasing the intensity of the welded joint. This makes it difficult for an element wire from becoming tapered at the welded joint as in the case shown in FIG. 6B even when friction stir welding is performed and, as compared to the case in which the element wires are not soldered, significantly increases tensile strength after welding. After the soldering processing, the solder adhered to the face of the joint between the strand coil 13 and the solid coil is removed by machining.

Conventional welding (for example, TIG welding) involves large quality-variations and high defect-generation rates. On the other hand, the method in this embodiment, which does not depend largely on the worker's professional skill, features small quality-variations and low defect-generation rate.

Figure 7A:
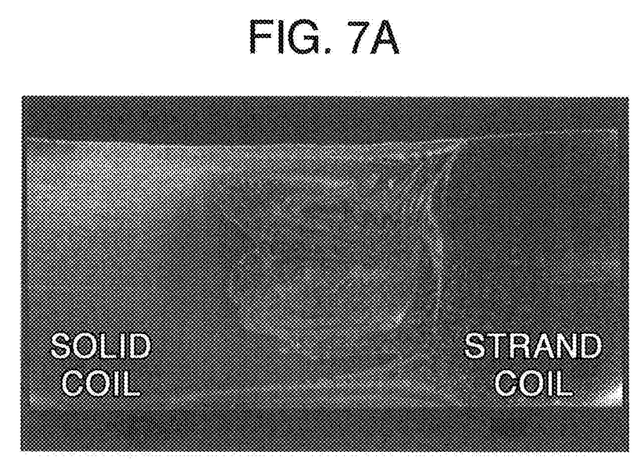
FIG. 7A is an enlarged photograph showing the cross section of a welded joint between a strand coil and a solid coil welded by friction stir welding in the manufacturing method of a rotor coil for a revolving armature according to the embodiment of the present invention, and is an enlarged photograph of a welded joint for which friction stir welding is performed with the strand coil arranged in the advancing side defined by the direction of rotation of the tool for friction stir welding and with the solid coil in the retreating side.
Figure 7B:
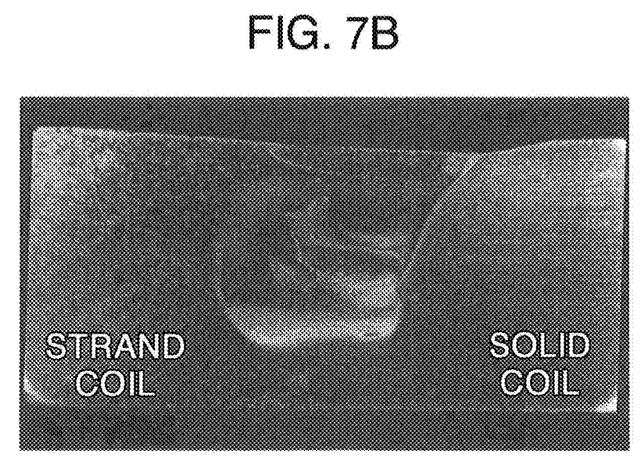
FIG. 7B is an enlarged photograph showing the cross section of a welded joint between a strand coil and a solid coil welded by friction stir welding in the manufacturing method of a rotor coil for a revolving armature according to the embodiment of the present invention, and is an enlarged photograph of a welded joint for which friction stir welding is performed with the strand coil arranged in the retreating side and with the solid coil arranged in the advancing side.

This embodiment ensures a reduction in the defect generation rate by performing friction stir welding for the butt joint 19 with the strand coil 13 arranged in the advancing side (AS) and with the solid coil 14 arranged in the retreating side (RS). Next, FIGS. 7A and 7B are enlarged photographs showing the cross section of a welded joint between a strand coil and a solid coil welded by friction stir welding using the manufacturing method of a rotor coil for a revolving armature in a variable speed generator motor according to this embodiment. FIG. 7A is an enlarged photograph of a welded joint for which friction stir welding is performed with a strand coil arranged in the advancing side defined by the direction of rotation of the tool for friction stir welding and with a solid coil in the retreating side. FIG. 7B is an enlarged photograph of a welded joint for which friction stir welding is performed with a strand coil arranged in the retreating side and with a solid coil arranged in the advancing side.

As shown in FIG. 7A and FIG. 7B, the welding state of the welded joint 22 (FIG. 7A) for which friction stir welding is performed in the arrangement, in which a strand coil is arranged in the advancing side (AS) and a solid coil 14 is arranged in the retreating side (RS), is better than the welding state of the welded joint 22 (see FIG. 7B) for which friction stir welding is performed in the reverse arrangement in which a strand coil is arranged in the retreating side (RS) and a solid coil 14 is arranged in the advancing side (AS).

In addition, as compared to a conventional method in which multi-layer welding is performed while measuring each interlayer temperature, the welded joint between the solid coil 14 and the strand coil 13 can be formed very easily in this embodiment using one-pass welding for each of both sides. "One-pass welding" refers to the friction stir welding process for one of the sides of a butt joint. Welding is completed when the friction stir welding processing is performed for both the front side and the reverse side.

Welding deformation is not generated easily in this embodiment as in conventional welding (for example, TIG welding). Therefore, high-accuracy mold casting is possible when an insulator is formed in a coil such as the strand coil 13.

As compared to conventional welding (for example, TIG welding), this embodiment ensures an improved working environment and a reduced running cost when a welded joint is formed.

While the embodiment of the present invention has been described, the present invention is not limited to the embodiment described above but may be implemented in various forms.

In the embodiment described above, the rotor coil 10 has been described on the assumption that the rotor coil 10 is used in a variable speed generator motor used in a reversible pumped system. However, the present invention is not limited to this type of coil but may be applied widely to a rotor coil for a revolving armature that has the welded joint 22 between the supported and secured solid coil 14a, 14b and the strand coil 13a, 13b.

In the embodiment described above, though the rotor coil 10 is described that has the welded joint 22 between the solid coil 14a, 14b, supported and secured by the binding wires 18a, 18b, and the strand coil 13a, 13b, the present invention is applicable widely to a rotor coil that has the welded joint 22 between the solid coil 14a, 14b, supported and secured by other joining means such as a bolt, and the strand coil 13a, 13b.

In the embodiment described above, though the rotor coil 10 is described that has the welded joint 22 between the end of the solid coil 14a, 14b, which is the coil end, and the strand coil 13a, 13b extending from within the core slot 12, that is, a rotor coil whose welded joint 22 is formed outside the core slot 12, the present invention is applicable also to a rotor coil in which the welded joint 22 is formed near to the coil end and within the core slot 12.

The present invention is applicable not only to an embodiment in which the welded joint 22 (butt joint 19) between the solid coil 14 and the strand coil 13 is tilted. The present invention of course includes an embodiment in which friction stir welding is performed without tilting the welded joint 22 (butt joint 19).

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A rotor coil for a revolving armature having a rotor, the rotor coil comprising:
    a strand coil composed of a plurality of element wires, and which includes a part arranged in a core slot of the rotor; and
    a solid coil welded to an end of the strand coil,
    wherein the end of the strand coil and an end of the solid coil are welded by friction stir welding,
    wherein a butt joint between the end of the solid coil and the end of the strand coil is tilted at a predetermined angle with respect to a width direction of the solid coil during the friction stir welding, and
    wherein, before the friction stir welding, the strand coil has the end thereof soldered with a solder material to integrate the element wires at the end of the strand coil into one unit.

2. The rotor coil according to claim 1, wherein the solder material is a silver solder.

3. The rotor coil according to claim 1, wherein the element wires have a rectangular cross-section.

4. The rotor coil according to claim 1, wherein the strand coil is oxygen-free copper.

5. The rotor coil according to claim 4, wherein the solid coil is silver containing, oxygen-free copper.

6. The rotor coil according to claim 1, wherein the solid coil is silver containing, oxygen-free copper.

7. A manufacturing method of a rotor coil for a revolving armature having a rotor, wherein the rotor coil comprises a strand coil composed of a plurality of element wires and that includes a part arranged in a core slot of the rotor and a solid coil, the manufacturing method comprising the steps of:
    soldering an end of the strand coil with a solder material to integrate the element wires at the end of the strand coil into one unit; and
    performing friction stir welding using a tool at a butt joint where an end of the solid coil and the soldered end of the strand coil are butted against each other and where the butt joint is tilted at a predetermined angle with respect to a width direction of the solid coil during performing the friction stir welding, wherein the tool used for the friction stir welding includes a shoulder that contacts a surface of the butt joint, a pin that sticks out from a center of the shoulder and penetrates into the butt joint, and the shoulder has a convex-face portion that rises from a shoulder outer edge toward the pin, and wherein the friction stir welding is performed with the end of the strand coil arranged on an advancing side and with the solid coil arranged on a retreating side, the advancing side defined by a rotational direction of the tool, the retreating side defined by the rotational direction of the tool.

8. The manufacturing method according to claim 7, wherein the butt joint is formed in such a way that an end angle of the strand coil on a side, from which the tool enters the butt joint, is acute.

9. A manufacturing method of a rotor coil for a revolving armature having a rotor, wherein the rotor coil comprises a strand coil composed of a plurality of element wires and that includes a part arranged in a core slot of the rotor, and a solid coil, the manufacturing method comprising the steps of:

soldering an end of the strand coil to integrate the element wires at the end of the strand coil into one unit; and performing friction stir welding on a butt joint where an end of the solid coil and the end of the strand coil butted against each other and where the butt joint is tilted at a predetermined angle with respect to a width direction of the solid coil during performing the friction stir welding.

10. The manufacturing method according to claim 9, further comprising the step of:

positioning the end of the solid coil and the end of the strand coil such that the butt joint runs along a width direction of the solid coil.

* * * * *